US008525828B1

(12) United States Patent
Bates

(10) Patent No.: US 8,525,828 B1
(45) Date of Patent: Sep. 3, 2013

(54) VISUALIZATION OF FIT, FLOW, AND TEXTURE OF CLOTHING ITEMS BY ONLINE CONSUMERS

(75) Inventor: Amy Bates, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 664 days.

(21) Appl. No.: 12/774,013

(22) Filed: May 5, 2010

(51) Int. Cl.
*G06T 15/00* (2011.01)

(52) U.S. Cl.
USPC .......... 345/419; 382/111; 700/132; 705/26.1; 705/26.7

(58) Field of Classification Search
USPC ....... 345/419; 382/111; 700/132; 705/26.1, 705/26.7
See application file for complete search history.

(56) References Cited

U.S. PATENT DOCUMENTS

| | | | | |
|---|---|---|---|---|
| 6,310,627 B1 * | 10/2001 | Sakaguchi | | 345/630 |
| 7,149,665 B2 * | 12/2006 | Feld et al. | | 703/2 |
| 7,487,116 B2 | 2/2009 | Paolini | | |
| 7,617,016 B2 * | 11/2009 | Wannier et al. | | 700/132 |
| 8,090,465 B2 * | 1/2012 | Zeng | | 700/132 |
| 2004/0083142 A1 * | 4/2004 | Kozzinn | | 705/27 |
| 2005/0234782 A1 * | 10/2005 | Schackne et al. | | 705/27 |
| 2007/0198120 A1 * | 8/2007 | Wannier et al. | | 700/138 |
| 2008/0163054 A1 * | 7/2008 | Pieper et al. | | 715/706 |
| 2009/0116698 A1 * | 5/2009 | Zhang et al. | | 382/111 |
| 2009/0276291 A1 * | 11/2009 | Wannier et al. | | 705/10 |
| 2010/0023421 A1 * | 1/2010 | Wannier et al. | | 705/26 |
| 2010/0049633 A1 * | 2/2010 | Wannier et al. | | 705/27 |
| 2010/0111370 A1 * | 5/2010 | Black et al. | | 382/111 |
| 2011/0184832 A1 * | 7/2011 | Wannier et al. | | 705/26.7 |
| 2011/0218664 A1 * | 9/2011 | Zeng | | 700/132 |

* cited by examiner

*Primary Examiner* — Kimbinh T Nguyen
(74) *Attorney, Agent, or Firm* — Hope Baldauff, LLC

(57) ABSTRACT

Technologies are described herein for providing visualization of fit, flow, and texture of clothing to an online consumer. A merchant maintains detailed measurements and a number of 3-D models for a clothing item offered for sale. The 3-D models may represent a representative size of the clothing item as worn by similarly sized mannequins or body models of varying body shapes. Each of the 3-D models captures the fit, flow, and texture of the clothing item as worn by the corresponding mannequin. When a consumer selects the clothing item, a 3-D virtualization representing the clothing item worn by the consumer may be generated by scaling the appropriate 3-D model based on dimensional data regarding the consumer, and then combining the scaled 3-D model with a 3-D avatar for the consumer. The dimensional data and 3-D avatar for the consumer may be supplied from a user profile associated with the consumer.

22 Claims, 7 Drawing Sheets

VISUALIZATION OF FIT, FLOW, AND TEXTURE OF CLOTHING ITEMS BY ONLINE CONSUMERS

BACKGROUND

Many types of products may be ordered online for delivery directly to a consumer, including clothing and other items that are purchased by size and fit. Online selection of clothing for purchase may be difficult however, because a consumer cannot get a clear idea of how a particular clothing item will fit the consumer's body, how the clothing item will flow over the body when worn by the consumer, or what the color and texture of the clothing item will be when worn, simply by reading a description of the item or by looking at a supplied photograph. Even if the item is shown in the photograph as being worn by a model, the model will typically be of a standard body size and shape that may not closely match the size and shape of the consumer's body. Because of the difficulty in selecting clothing items online, online merchants of clothing often experience high return-rates for these items, thus increasing costs to both the merchant and the consumers.

It is with respect to these and other considerations that the disclosure made herein is presented.

DETAILED DESCRIPTION

Figure 1:
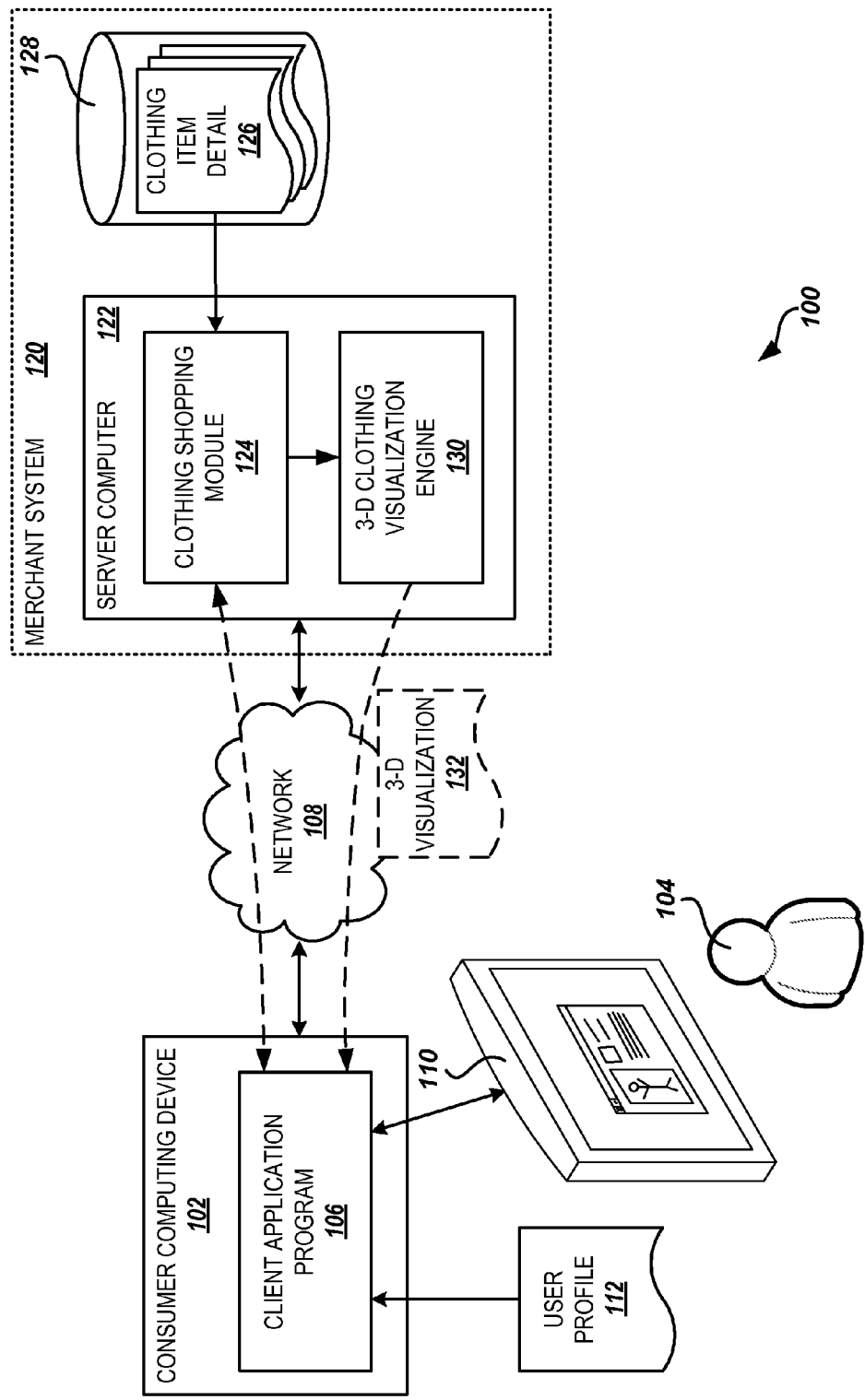
FIG. 1 is a system diagram showing aspects of an illustrative operating environment for providing visualization of fit, flow, and texture of clothing, including several software and hardware components provided by embodiments presented herein.

The following detailed description is directed to technologies for providing visualization of fit, flow, and texture of clothing to an online consumer. Utilizing the embodiments described herein, a consumer of clothing items is provided a three-dimensional ("3-D") visualization of how a selected clothing item will look when worn by the consumer. The consumer may further interact with the 3-D visualization of the clothing item, viewing the visualization from different perspectives or levels of detail, in order to get a clearer idea of the fit, flow, and texture of the clothing item before purchasing the item from the merchant. In this way, returns of such clothing items may be reduced, thereby reducing overall costs to both the merchant and the consumers.

According to embodiments, a merchant maintains detailed measurements and a number of 3-D models for a clothing item offered for sale by the merchant. The 3-D models represent a representative size of the clothing item as worn by similarly sized mannequins or body models of varying body shapes. Each of the 3-D models captures the fit, flow, and texture of the clothing item as worn by the corresponding mannequin. When a consumer selects the clothing item, a 3-D visualization representing the clothing item worn by the consumer may be generated by scaling the appropriate 3-D model based on dimensional data regarding the consumer, and then combining the scaled 3-D model with a 3-D avatar for the consumer. The dimensional data and 3-D avatar for the consumer may be supplied from a user profile associated with the consumer.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for providing visualization of fit, flow, and texture of clothing, according to embodiments provided herein. The environment 100 includes a consumer computing device 102 utilized by a consumer 104 to access a merchant system 120 across a network 108. The consumer computing device 102 may be a personal computer ("PC"), a laptop, a notebook, a personal digital assistant ("PDA"), a game console, a set-top box, an e-reader, a consumer electronics device, a server computer, or any other computing device capable of connecting to the network 108 and communicating with the merchant system 120.

The consumer 104 may be an individual or entity that desires to select clothing and other products for purchase from the merchant. The network 108 may be a local-area network ("LAN"), a wide-area network ("WAN"), the Internet, or any other networking topology known in the art that connects the consumer computing device 102 to the merchant system 120. The merchant system 120 may include a server computer 122 that provides various shopping application services to the consumer computing device 102 over the network 108. The server computer 122 shown in FIG. 1 may represent one or more web servers, application servers, network appliances, dedicated computer hardware devices, personal computers ("PC"), or any combination of these and/or other computing devices known in the art.

The consumer 104 may use a client application program 106 executing on the consumer computing device 102, such as a Web browser, to access and utilize the services provided by the server computer 122 across the network 108. Alternatively, the consumer computing device 102 may utilize any number of communication methods known in the art to communicate with the merchant system 120 and/or the server computer 122 across the network 108, including Web service calls, proprietary client-server architectures, and the like. The server computer 122 may execute a number of modules in order to provide the services to the consumer computing device 102. The modules may execute on a single server computer 122 or in parallel across multiple server computers in the merchant system 120. In addition, each module may consist of a number of subcomponents executing on different server computers 122 in the merchant system 120. The modules may be implemented as software, hardware, or any combination of the two.

In one embodiment, a clothing shopping module 124 executes on the server computer 122. The clothing shopping module 124 provides services to the consumer computing device 102 that allow a consumer 104 utilizing the device to select and purchase clothing items offered by the merchant. The consumer 104 may perform these functions through a user interface ("UI") presented by the clothing shopping module 124 to the consumer 104 at the consumer computing device 102. The clothing shopping module 124 may present the UI to the consumer 104 by sending a series of Web pages to be rendered by the client application program 106 executing on the consumer computing device 102, for example. The client application program 106 may then render the UI to a display device 110 connected to the consumer computing device 102.

According to embodiments, the consumer 104 may utilize the UI to view information regarding the clothing items offered by the merchant, as will be described below in regard to FIG. 7. The clothing shopping module 124 may retrieve the information regarding each clothing item from one or more clothing item details 126 stored in the merchant system 120. The clothing item details 126 are data structures containing detailed information regarding each clothing item offered for sale by the merchant, as will be described in detail below in regard to FIG. 2. The clothing item details 126 may be stored in a data storage system 128, such as a database server, that is accessible by the server computer and other components of the merchant system 120.

As will be described herein, the UI presented by the clothing shopping module 124 further provides a visualization of the fit, flow, and texture of a particular clothing item with respect to the body of the consumer 104. The fit of the clothing item may include the coverage of the clothing item along the body dimensions, such as how long the sleeves of a shirt are relative to the arm length, how closely the clothing item draws around the neck, how tightly the clothing item fits around the armscye, and the like. The flow of the clothing item determines whether the clothing item hangs or falls loosely from the body, or whether it hugs the contours of the body shape. The texture of the clothing item includes the look and feel of the types and colors of the fabrics and other materials utilized in manufacturing the clothing item.

In one embodiment, this visualization is provided by rendering a 3-D graphic visualization of the consumer 104 showing the selected clothing item worn on the body of the consumer. As will be described in more detail below in regard to FIG. 8, this may be accomplished by combining detailed measurements of the clothing item and a 3-D model generated by a scan of a mannequin or other body model wearing the clothing item with a 3-D virtual representation of the consumer's body, referred to as a "3-D avatar." The detailed measurements and 3-D model of the clothing item may be contained in the clothing item detail 126 corresponding to the clothing item, as will be described below in more detail in regard to FIG. 2, while the 3-D avatar representing the body of the consumer 104 may be contained in a user profile 112 associated with the consumer.

The user profile 112 may be a data structure that stores information about the consumer 104, including the 3-D avatar and information regarding the consumer's body shape and size, as will be described in more detail below in regard to FIG. 6. In one embodiment, the user profile 112 is stored on the consumer computing device 102 and accessed by the clothing shopping module 124 over the network 108 through the client application program 106. For example, the user profile 112 associated with a particular consumer 104 may be stored in a gaming console and made available to the clothing shopping module 124 through an API provided by the operating system ("OS") of the console. In another embodiment, a user profile 112 may be stored for each consumer 104 in the merchant system 120.

As will be further described below in regard to FIG. 8, the clothing shopping module may retrieve the detailed measurements and 3-D model of the selected clothing item from the clothing item detail 126 and the 3-D avatar representing the consumer 104 from the user profile 112 and provide the information to a 3-D clothing visualization engine 130. The 3-D clothing visualization engine 130 may then mathematically synthesize the information to compute a 3-D visualization 132 representing the consumer 104 wearing the selected clothing item. The 3-D visualization 132 may then be transmitted to the consumer computing device 102 where it is rendered to the display device 110.

The 3-D clothing visualization engine 130 may be implemented as hardware, software, or a combination of the two, and may include a number of application program modules and other components executing on the server computer 122 and/or the consumer computing device 102. In one embodiment the 3-D clothing visualization engine 130 may utilize 3-D animation services provided by the client application program 106, such as through a Web browser plug-in module, to render the 3-D visualization 132 on the display device 110, as well as to allow the consumer 104 to interact with the visualization through the consumer computing device 102.

Figure 2:
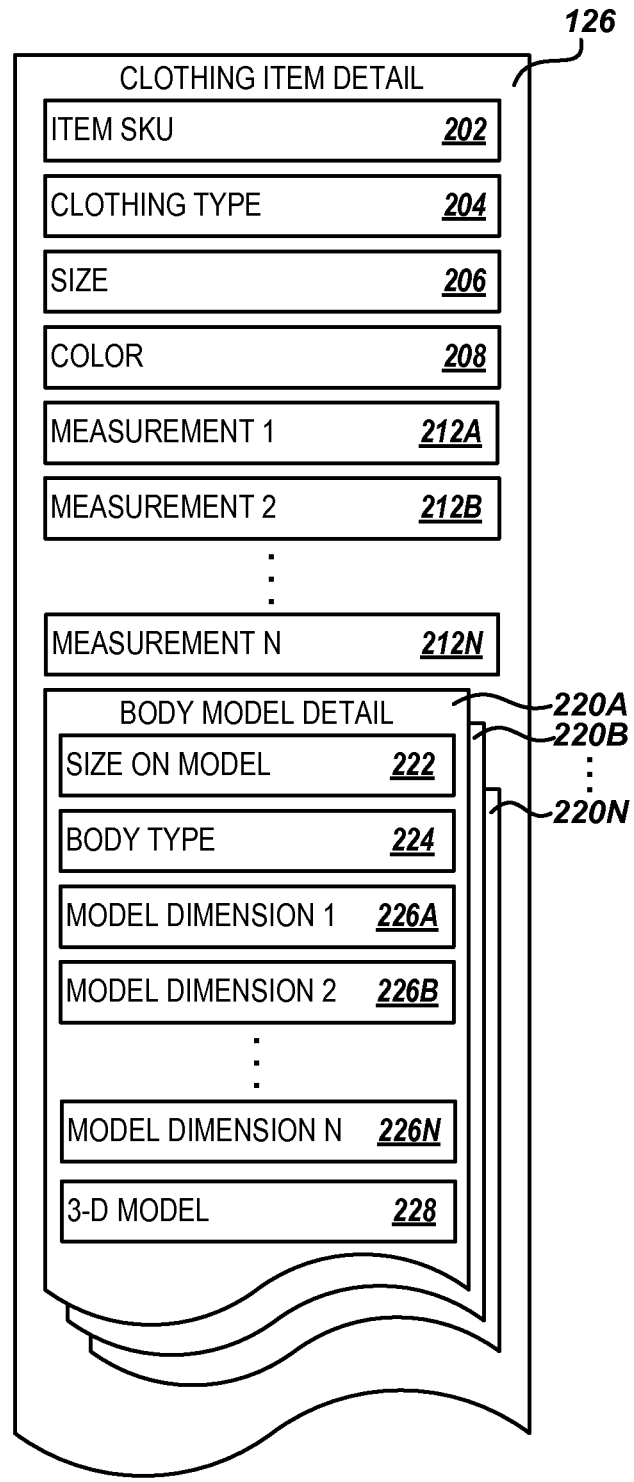
FIG. 2 is a data structure diagram illustrating a number of data elements maintained for a clothing item detail, according to embodiments presented herein.
Figure 6:
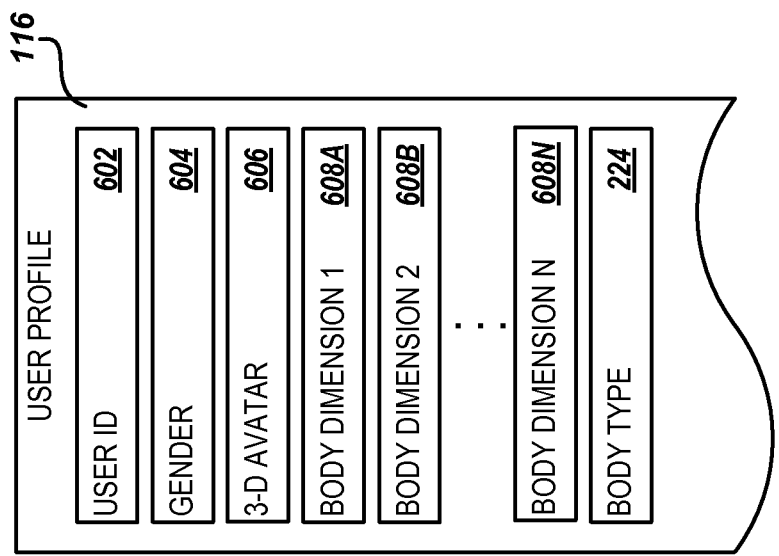
FIG. 6 is a data structure diagram illustrating a number of data elements maintained for a user profile, according to embodiments presented herein.

Referring now to FIGS. 2 and 6, a number of data elements stored in data structures will be described. It will be appreciated by one skilled in the art that each of the data structures shown in the figures may represent a database table, an object stored in a computer memory, a programmatic structure, or any other data container commonly known in the art. Each data element included in the data structures may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data elements that may be contained in the clothing item detail 126, according to embodiments. As described above, the clothing item detail 126 may contain information regarding a corresponding clothing item offered for sale by the merchant. The clothing item detail 126 may include an item SKU 202 that identifies the specific clothing item to the clothing shopping module 124 and the other modules of the merchant system 120. The clothing item detail 126 may also include a clothing type 204 that indicates the specific type of the corresponding clothing item, such as shirt, pants, dress, skirt, sweater, and the like; a category for the clothing item, such as world, intimate apparel, outerwear, and the like; and any combination of these and other type and category designations.

The clothing item detail 126 may include a size 206 and color 208 of the clothing item corresponding to the item SKU 202. According to one embodiment, every size and color combination of a particular clothing item is represented by a distinct item SKU 202. It will be appreciated that other schemes for identifying a particular size and color of a particular clothing item may be utilized that may include a combination of the item SKU 202, the size 206, the color 208, and other identifying data elements. The values for the size 206 of the clothing item detail 126 may depend on the clothing type 204 of the clothing item, and may include size designations, such as x-small, small, medium, large, and x-large; recognized sizing numbers, such as size 2, size 4, size 6, size 8, and size 10; or some combination of body measurements, such as waist and inseam, neck and sleeve length, and the like. The color 208 may indicate a color, pattern, material, or any combination of these aspects of the clothing item corresponding to the clothing item detail 126.

Figure 3:
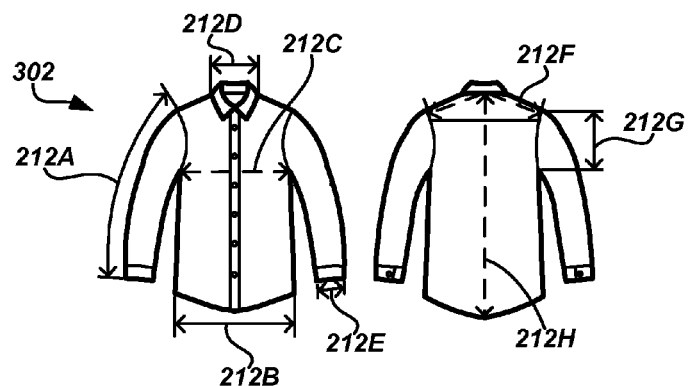
FIG. 3 is a front and back view of an exemplary clothing item offered for sale by the merchant illustrating measurements maintained for the clothing item, according to embodiments presented herein.

According to embodiments, the clothing item detail 126 also includes one or more detailed measurements 212A-212N (referred to herein generally as measurement 212) for the corresponding clothing item. The number and types of measurements 212 included in the clothing item detail 126 may depend on the clothing type 204 and other factors of the corresponding clothing item. For example, FIG. 3 shows a number of measurements 212 that may be stored for a shirt-type clothing item 302. The measurements 212 for a shirt-type clothing item 302 stored in the clothing item detail 126 may include the sleeve length (indicated at 212A in FIG. 3), the width of the torso opening (212B), the chest width and/or diameter (212C), the width and/or diameter of the neck (212D), the width and/or diameter of the cuff (212E), the shoulder-to-shoulder width (212F), the width and/or diameter of the armhole ("the armscye") (212G), the neck-to-tail length (212H), and the like.

The detailed measurements 212 may be obtained from the manufacturer of the corresponding clothing item 302, or each clothing item offered by the merchant may be measured at the merchant's location manually. In one embodiment, the measurements 212 for a clothing item 302 may be obtained through a 3-D scanning process, as will be described below. It will be appreciated that the measurements 212 for a particular clothing item will be different for the various item SKUs 202 identifying a clothing item of various sizes 206, but may be the same across item SKUs 202 for different colors 208.

The clothing item detail 126 also includes a number of associated body model details 220A-220N (referred to herein generally as body model detail 220) for the corresponding clothing item, according to further embodiments. Each body model detail 220 contains information regarding a 3-D scan of the corresponding clothing item worn by a mannequin or other body model. Each body model detail 220 may contain a size on model 222 indicating the size of the clothing item worn by the corresponding mannequin or body model, and a body type 224 indicating a body shape or category of the corresponding mannequin.

Figure 4:
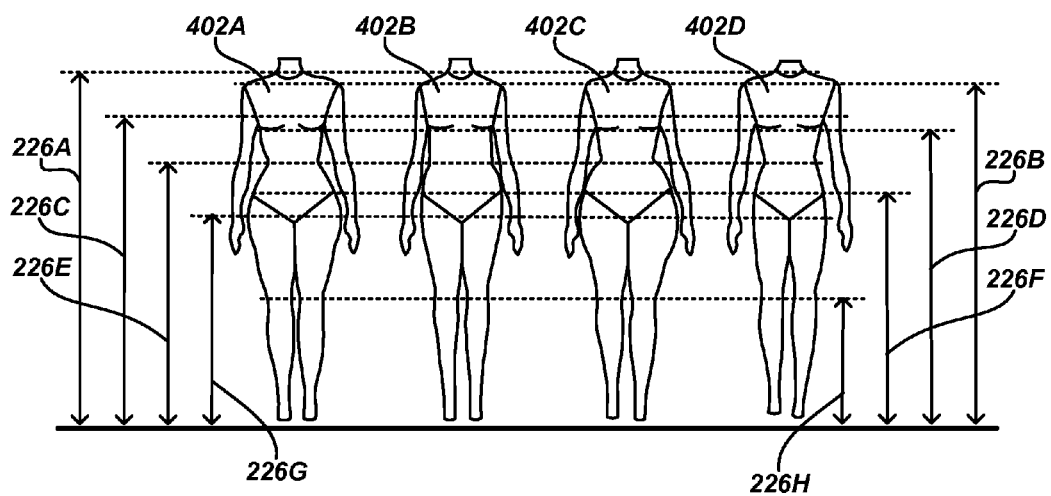
FIG. 4 is a front-view of a number of exemplary mannequins or body models illustrating model dimensions determined for each, according to embodiments presented herein.

In one embodiment, a representative size 206 of the corresponding clothing item 302 is placed on a number of mannequins 402A-402D (referred to herein generally as mannequin 402), as shown in FIG. 4. Each mannequin 402 may be of similar size, but have a distinct body shape or type, such as hour-glass shape (such as mannequin 402A in FIG. 4), rectangular shape (402B), pear shape (402C), inverted-triangle shape (402D), and the like. The size on model 222 for each body model detail 220 associated with the clothing item detail 126 may indicate the representative size 206 placed on the corresponding mannequin 402, while the body type 224 indicates the body shape or category of the mannequin. It will be appreciated that more or less than the number and shapes of mannequins or body models shown in FIG. 4 may be utilized, resulting in additional or less body model details 220 associated with the clothing item detail 126.

Each body model detail 220 also contains a number of model dimensions 226A-226N (referred to herein generally as model dimension 226) for the corresponding mannequin 402. According to one embodiment, each mannequin 402 of a specific size and body type 224 will have detailed dimensional data. Some model dimensions 226 may be the same across mannequins 402 of similar size but of different body type 224, while other model dimensions will vary across mannequins of the same size. As further shown in FIG. 4, the model dimensions 226 may include a neck height (indicated at 226A), shoulder height (226B), bust height (226C), chest height (226D), waist height (226E), hip height (226F), inseam (226G), and knee height (226H).

It will be appreciated that many more model dimensions 226 may be determined for each mannequin 402 and stored in the body model detail 220, beyond those shown in FIG. 4. Such additional model dimensions 226 may include any combination of the dimensions shown in TABLE 1 below. As will be described in more detail in regard to FIG. 7, the model dimensions 226 contained in the body model detail 220 will be utilized in generating the 3-D visualization 132 of the clothing item 302 as worn by the consumer's avatar.

TABLE 1

| Body Dimensions | | |
| --- | --- | --- |
| Girth | Length | Width |
| Abdomen | Ankle | Back (high) |
| Ankle | Arm (overall) | Back (mid) |
| Armhole (armscye) | Arm (under) | Back (low) |
| Bust (overall) | Arm (upper) | Bust (women) |
| Bust (above breasts) | Armhole | Buttocks |
| Bust (under breasts) | Armhole (depth) | Calf |

TABLE 1-continued

Body Dimensions

| Girth | Length | Width |
|---|---|---|
| Calf | Base of neck (seated) | Chest |
| Chest | Base of neck (standing) | Elbow |
| Elbow | Base of neck to bottom of feet | Fingers |
| Fingers | | Foot |
| Foot | Crotch | Hand |
| Forearm | Crotch (inside) | Head |
| Hand | Fingers | Hips |
| Head | Foot | Knee |
| Hip (overall) | Hand | Neck |
| Hip (high point) | Hip (overall) | Shoulder |
| Hip (seated) | Hip (high) | Thigh (high) |
| Knee (overall) | Knee | Thigh (mid) |
| Knee (high) | Leg (inside) | Thigh (low) |
| Knee (low) | Leg (outside) | Toes |
| Leg (lower) | Overall | Waist |
| Neck | Shoulder | Wrist |
| Neck base | Thigh | |
| Shoulder | Toes | |
| Toes | Torso | |
| Thigh (overall) | Waist | |
| Thigh (mid-point) | | |
| Thigh (seated) | | |
| Upper arm | | |
| Waist | | |
| Wrist | | |

Figure 5:
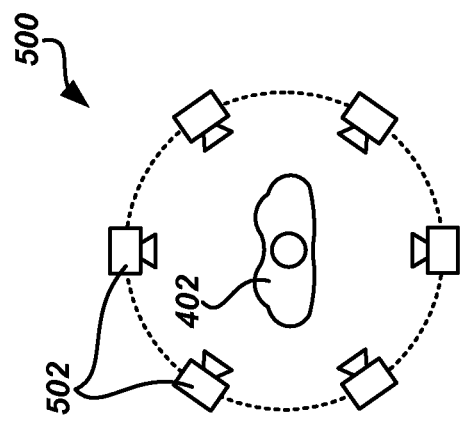
FIG. 5 is a top-view of an apparatus for scanning a clothing item on a mannequin or body model, according to embodiments presented herein.

Each body model detail 220 also contains a 3-D model 228 comprising photographic data, vector graphics, texture maps, and other modeling components obtained by scanning the corresponding mannequin 402 wearing the clothing item 302. For example, the 3-D model 228 may be obtained through a scanning apparatus 500 that captures multiple photographic images of the mannequin 402 wearing the clothing item 302 from multiple cameras 502 at varying angles, as shown in FIG. 5. 3-D modeling software may then be used to synthesize the 3-D model 228 from the photographs. In another example, the scanning apparatus 500 may consist of a combination of active and/or passive 3-D scanners that could be used to obtain the 3-D model 228 directly from the mannequin 402. According to one embodiment, visual recognition logic may be employed during the 3-D scanning process to obtain the model dimensions 226 for the body model detail 220 and/or the measurements 212 for the corresponding clothing item 302.

The 3-D model 228 in the body model detail 220 captures the fit, flow, and texture of the clothing item corresponding to the clothing item detail 126 as worn by the mannequin 302. The fit and flow may be captured by the 3-D scanning process through the use of markers or sensors on the mannequins 402. For example, the surface of the mannequin 402 may be covered with markers or painted a distinguishing color, such that portions of the surface of the mannequin not covered by the clothing item 302 may be identified in the photographic images taken by the scanning apparatus 500 shown in FIG. 5. In another example, sensors may be placed on the surface of the mannequin 402 that capture data regarding the fit, flow, and texture of the clothing item 302, and the captured data may be included in the 3-D model 228 produced from the scanning process.

In a further embodiment, multiple scans may be made during the scanning process with the mannequin 402 placed in a variety of poses or simulated movements. For example, the mannequin may be photographed or scanned while standing, sitting in a standard height chair, during a simulation of the raising of the arms in front, during a simulation of the raising of the arms above the head, during a simulation of walking, during a simulation of squatting, and the like. Taking multiple scans of the mannequins 402 in a variety of poses and simulated movements may provide additional data as to the flow and flexibility of the clothing item 302.

It will appreciated that associated body model details 220 may be stored separately from the clothing item detail 126 and shared across clothing item details 126 of the same size. It will be further appreciated that the clothing item detail 126 may include other data elements and information regarding the corresponding clothing items beyond those shown in FIG. 2 and described above that are utilized by the clothing shopping module 124 and other modules of the merchant system 120 to provide shopping services for clothing to the consumer 104, such as a title of the clothing item, a description of the item, a purchase price, detailed specifications, and the like.

FIG. 6 shows one example of data elements that may be contained in the user profile 112, according to embodiments. As described above, the user profile 112 stores information about the consumer 104, including information regarding the consumer's body utilized to generate the 3-D visualization 132. The user profile 112 may include a user ID 602 that uniquely identifies the consumer 104 to the clothing shopping module 124 and/or other modules of the merchant system 120. The user profile 112 may also include a gender 604 indicating the gender of the consumer 104. The gender 604 of the consumer 104 may be utilized by the clothing shopping module 124 in selecting clothing choices and interpreting sizes for the consumer.

The user profile 112 further includes the 3-D avatar 606 associated with the consumer 104, as described above in regard to FIG. 1. The 3-D avatar 606 may comprise photographic data, vector graphics, texture maps, and/or other modeling components that represent the body of the consumer 104. In one embodiment, the 3-D avatar 606 in the user profile 112 may be built by the consumer 104 utilizing services and UIs supplied by the merchant system 120. Alternatively, the 3-D avatar 606 may be generated by the 3-D clothing visualization engine 130 or another module of the merchant system 120 from body dimension data and body type data supplied by the consumer 104 or contained in the user profile 112.

In a further embodiment, the 3-D avatar 606 may be created and maintained in the user profile 112 by the consumer computing device 102. For example, a gaming console may have a camera system attached that is capable of measuring the shape and dimensions of the consumer's body. The measured dimensions may be utilized to generate an accurate 3-D avatar 606 that may be stored in the user profile 112 for the consumer 104 maintained on the gaming console. It will be appreciated that the 3-D avatar 606 associated with the consumer 104 may be generated or supplied by any number of systems and components known in the art for creating and maintaining a 3-D avatar for visualizing an individual. It is intended that this application include all such 3-D avatars.

The user profile 112 may also include a number of body dimensions 608A-608N (referred to herein generally as body dimension 608) for the consumer 104. Any number of the dimensions enumerated in Table 1 above may be maintained in the user profile of a particular consumer 104. Some or all of the body dimensions 608 included in the user profile 112 may correspond to the detailed model dimensions 226 maintained for each mannequin 402 and stored in the various body model details 220, as described above in regard to FIG. 2. The individual values for each body dimension 608 may be supplied by the consumer 104, or the body dimensions may be extracted from the 3-D avatar 606 included in the user profile 112.

The user profile 112 may also include a body type 224 indicating the body shape or category of the consumer 104. The body type 224 in the user profile 112 may be utilized to select from among the body model details 220 associated with the clothing item detail 126 corresponding to a selected clothing item when generating the 3-D visualization 132 representing the consumer 104 wearing the clothing item, as will be described in more detail below in regard to FIG. 8. In one embodiment, the body type 224 may be supplied by the consumer 104. In another embodiment, the body type 224 may be determined from ratios of various body dimensions 608 of the consumer 104. For example, the body type 224 of the consumer 104 may be determined by comparing the consumer's overall height, the girth of their chest or bust, the girth of their waist, and the girth of their hips, and then evaluating these ratios against established ranges for various defined body types. It will be appreciated that the user profile 112 may contain additional data elements beyond those shown in FIG. 6 and described above that are utilized by the clothing shopping module 124 and/or other modules of the merchant system 120.

Figure 7:
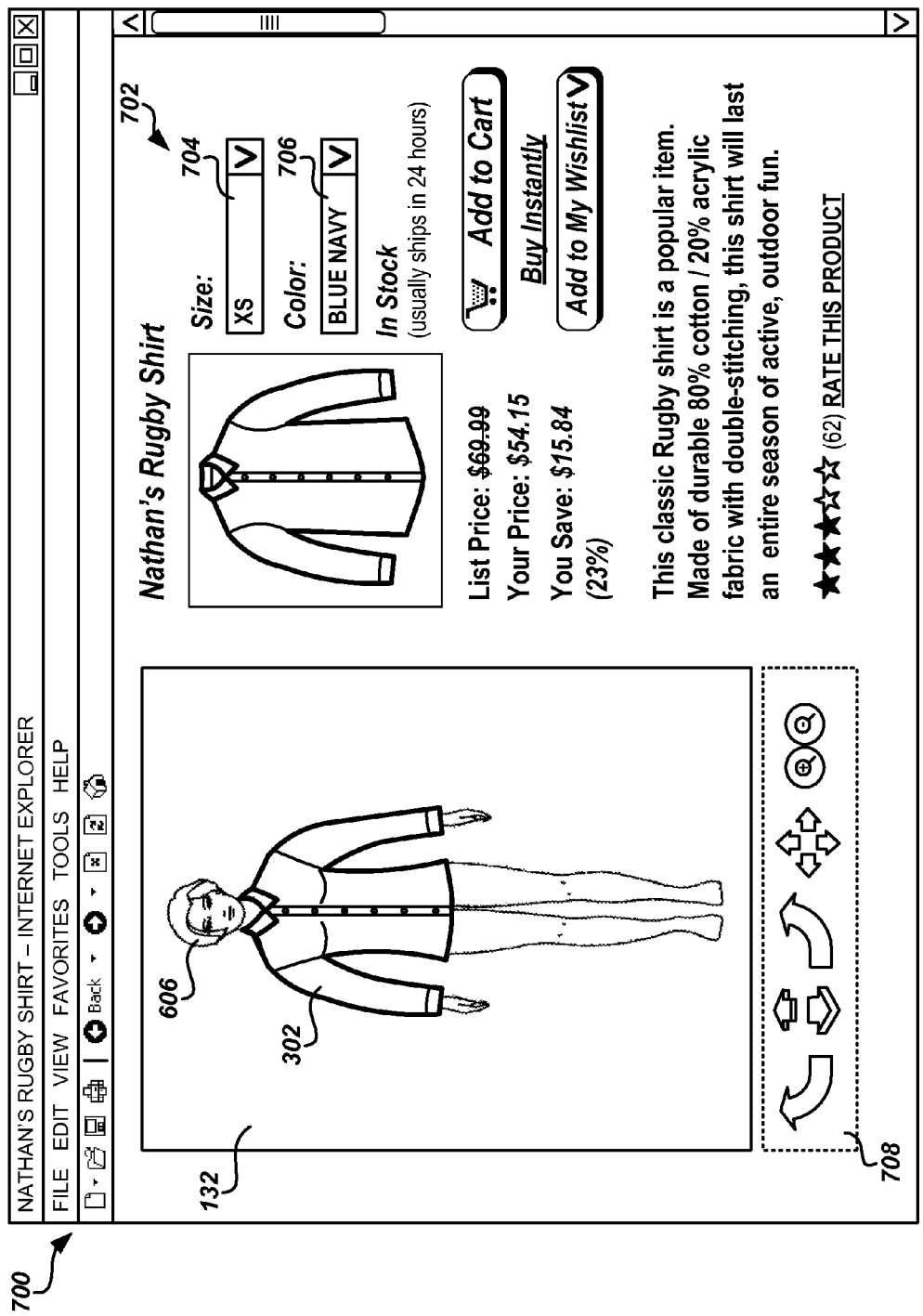
FIG. 7 is a display diagram showing an illustrative user interface for visualizing fit, flow, and texture of clothing, according to embodiments presented herein.

FIG. 7 shows an illustrative user interface 700 for visualizing fit, flow, and texture of a clothing item by an online consumer 104, according to one embodiment. As described above in regard to FIG. 1, the clothing shopping module 124 and 3-D clothing visualization engine 130 may operate in conjunction with the consumer computing device 102 to present the user interface 700 to the consumer 104 to allow the consumer to view information regarding a selected clothing item offered by the merchant, as well as view and interact with the 3-D visualization 132 representing the consumer wearing the selecting clothing item.

As shown in FIG. 7, the user interface 700 may include detailed information 702 regarding the selected clothing item, including a title for the item; a description; price, availability, and purchase information regarding the item; and the like. The user interface 700 may contain a size selection UI control 704 and a color selection UI control 706 allowing the consumer 104 to select from the various sizes 206 and colors 208 available for the selected clothing item. In another embodiment, the clothing shopping module may suggest the correct size of the clothing item for the consumer 104 based on the measurements 212 for the clothing item from the corresponding clothing item detail 126 and the body dimensions 608 for the consumer from the user profile 112.

The user interface 700 further includes a view of the 3-D visualization 132 generated by the 3-D clothing visualization engine 130. As described above in regard to FIG. 1, the 3-D visualization 132 comprises graphical representation of the 3-D avatar 606 for the consumer 104 wearing the clothing item 302. According to embodiments, the 3-D visualization 132 shows the fit of the clothing item 302 according to the dimensions of the 3-D avatar 606, the flow of the item over the contours of the 3-D avatar, and the color and texture of the item. In one embodiment, the user interface 700 further includes a group of 3-D motion UI controls 708 that allow the consumer to interact with the 3-D visualization 132 in order to see the 3-D avatar 606 and clothing item 302 from different angles and at different levels of detail.

It will be appreciated that other interface methods may be utilized to allow the consumer 104 to interact with the 3-D visualization, according to the capabilities of the consumer computing device 102. For example, a gaming console may have a motion-capture camera input system attached that is capable of measuring the position and orientation of the consumer's body in real-time. The motion-capture camera input may be used to correspondingly manipulate the position and orientation of the 3-D avatar 606 and clothing item 302 in the 3-D visualization, allowing the consumer 104 to visualize the fit, flow, and texture of the clothing item from a particular angle, with their arms raised, or while bending over, for example. Other input devices and interaction methods will be apparent to one skilled in the art, including, but not limited to, traditional game pads, trackballs, touch-screens, gyroscopic controllers, motion sensing controllers, and the like.

Additional interactions with the 3-D visualization 132 may be provided through the user interface 700, according to further embodiments. For example, the consumer 104 may be able to select multiple clothing items 302 from a list of items and place them on the 3-D avatar 606 in the 3-D visualization 132 in order to see how the clothing items layer or interact. The user interface 700 may include a drag-and-drop capability of clothing items 302 onto the 3-D avatar 606, with a clothing item of a specific clothing type 204 replacing any existing items of that type currently in the 3-D visualization 132.

The clothing items may be selected through a conventional browse and search user interface (not shown), or may be suggested by the clothing shopping module 124 based on potential fit, determined by the measurements 212 for the clothing item and the body dimensions 608 for the consumer 104, or from selected clothing sets or types known to be complementary or compatible with the originally selected item. In a further embodiment, the consumer 104 may scan or describe a number of their own clothing items for which the clothing shopping module 124 may generate and store clothing item details 126. These consumer-specific clothing item details 126 may then be utilized by the consumer 104 to provide default clothes for the 3-D visualization 132, allowing the consumer to visualize a selected shirt with their favorite pair of pants, for example. The clothing shopping module 124 may further utilize the consumer-specific clothing item details 126 to make additional suggestions of clothing items that may be compatible with or complementary to the consumers' default clothing.

Figure 8:
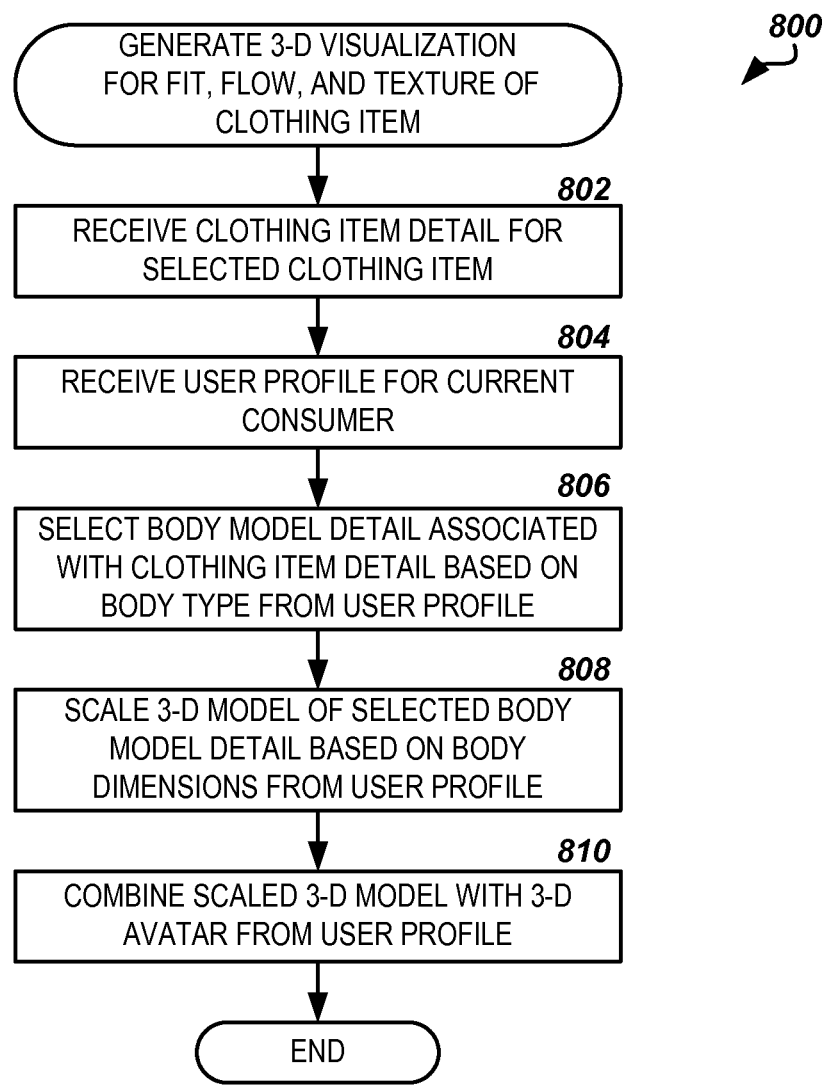
FIG. 8 is a flow diagram showing a method for generating a three-dimensional visualization of the fit, flow, and texture of a selected clothing item, according to embodiments described herein.

Turning now to FIG. 8, additional details will be provided regarding the embodiments presented herein for providing visualization of fit, flow, and texture of clothing to an online consumer. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 8 illustrates a routine 800 for generating the 3-D visualization 132 representing the consumer 104 wearing the selected clothing item(s) 302, according to embodiments. In one embodiment, the routine 800 is performed by the 3-D clothing visualization engine 130 described above in regard to FIG. 1. It will be appreciated that the routine 800 may also be performed by other modules and components of the merchant system 120, or by a combination of modules and components in the merchant system and on the consumer computing device 102.

The routine 800 begins at operation 802, where the 3-D clothing visualization engine 130 receives the clothing item detail 126 corresponding to the selected clothing item 302 from the clothing shopping module 124. In one embodiment, the 3-D clothing visualization engine 130 may receive multiple clothing item details 126 corresponding to multiple selected clothing items to be utilized in the generation of the 3-D visualization 132, as described above in regard to FIG. 7. From operation 802, the routine 800 proceeds to operation 804, where the 3-D clothing visualization engine 130 further receives the user profile 112 for the current consumer 104. As described above in regard to FIG. 1, the clothing shopping module 124 may retrieve the user profile 112 from the consumer computing device 102 or from a data storage system 128 in the merchant system 120, and then pass it to the 3-D clothing visualization engine 130 along with the clothing item detail 126.

The routine 800 proceeds from operation 804 to operation 806, where the 3-D clothing visualization engine 130 selects the body model detail 220 associated with the clothing item detail 126 that matches the body type 224 of the consumer 104 from the user profile 112. According to one embodiment, the 3-D clothing visualization engine 130 may simply match the body type 224 specified in the user profile 112 to the body type of the associated body model detail 220. Alternatively, the 3-D clothing visualization engine 130 may analyze the 3-D avatar 606 and/or the body dimensions 608 in the user profile 112 to determine the most appropriate body type 224 which to select from among the body model details 220 associated with the clothing item detail 126.

From operation 806, the routine 800 proceeds to operation 808, where the 3-D clothing visualization engine 130 scales the 3-D model 228 from the selected body model detail 220 according to a comparison of the model dimensions 226 from the body model detail with corresponding body dimensions 608 in the user profile 112. As described above in regard to FIG. 2, the 3-D model 228 may be obtained by scanning a representative size 206 of the corresponding clothing item 302 placed on a similarly sized mannequin of the indicated body type 224. The 3-D clothing visualization engine 130 will use the differences between the model dimensions 226 for the representative sized mannequin and the body dimensions 608 in the user profile 112 to scale the 3-D model 228 to the appropriate size for generation in the 3-D visualization 132. This will allow the fit, flow, and texture of the clothing item captured in the 3-D model 228 to be included in the 3-D visualization 132 at the proper shape and size in regard to the 3-D avatar 606 from the user profile 112.

As further described above in regard to FIG. 2, the body dimensions 608 included in the user profile 112 may not have a one-to-one correspondence to the model dimensions 226 in the body model detail 220. This may depend on the source of the user profile 112 and the associated 3-D avatar 606, for example. The 3-D clothing visualization engine 130 will determine the set of corresponding model dimensions 226 and body dimensions 608 that are to be used to scale the 3-D model 228. In a further embodiment, the 3-D clothing visualization engine 130 also uses a comparison of the measurements 212 from the clothing item detail 126 corresponding to the representative size 206 of the clothing item on the mannequins 302 or body models and the measurements from the clothing item detail corresponding to the selected size of the clothing item to aid in the scaling of the 3-D model 228 and the generation of the 3-D visualization.

The routine 800 proceeds from operation 808 to operation 810, where the 3-D clothing visualization engine 130 combines the scaled 3-D model 228 with the 3-D avatar 606 from the user profile 112 to generate the 3-D visualization 132. This combination may be performed by any number of 3-D modeling techniques known in the art, and the methods selected may depend on the format of the data in the 3-D model 228 and 3-D avatar 606, the 3-D rendering capabilities of the consumer computing device 102, and other factors. It is intended that this application include all such techniques for combining the scaled 3-D model 228 with the 3-D avatar to produce the 3-D visualization 132 representing the consumer 104 wearing the selected clothing item 302. From operation 810, the routine 800 ends.

Once the 3-D visualization 132 is complete, it may be sent to the consumer computing device 102 to be rendered by the client application program 106 as part of the user interface 700 described above in regard to FIG. 7. According to one embodiment, the 3-D visualization 132 contains a complete 3-D model of the consumer's avatar wearing the selected clothing item(s), such that interaction of the consumer 104 with the 3-D visualization 132 is performed locally at the consumer computing device 102. In another embodiment, the interactions with the 3-D visualization 132 may be handled by a combination of the clothing shopping module 124 and the 3-D clothing visualization engine 130 executing in the merchant system 120.

Figure 9:
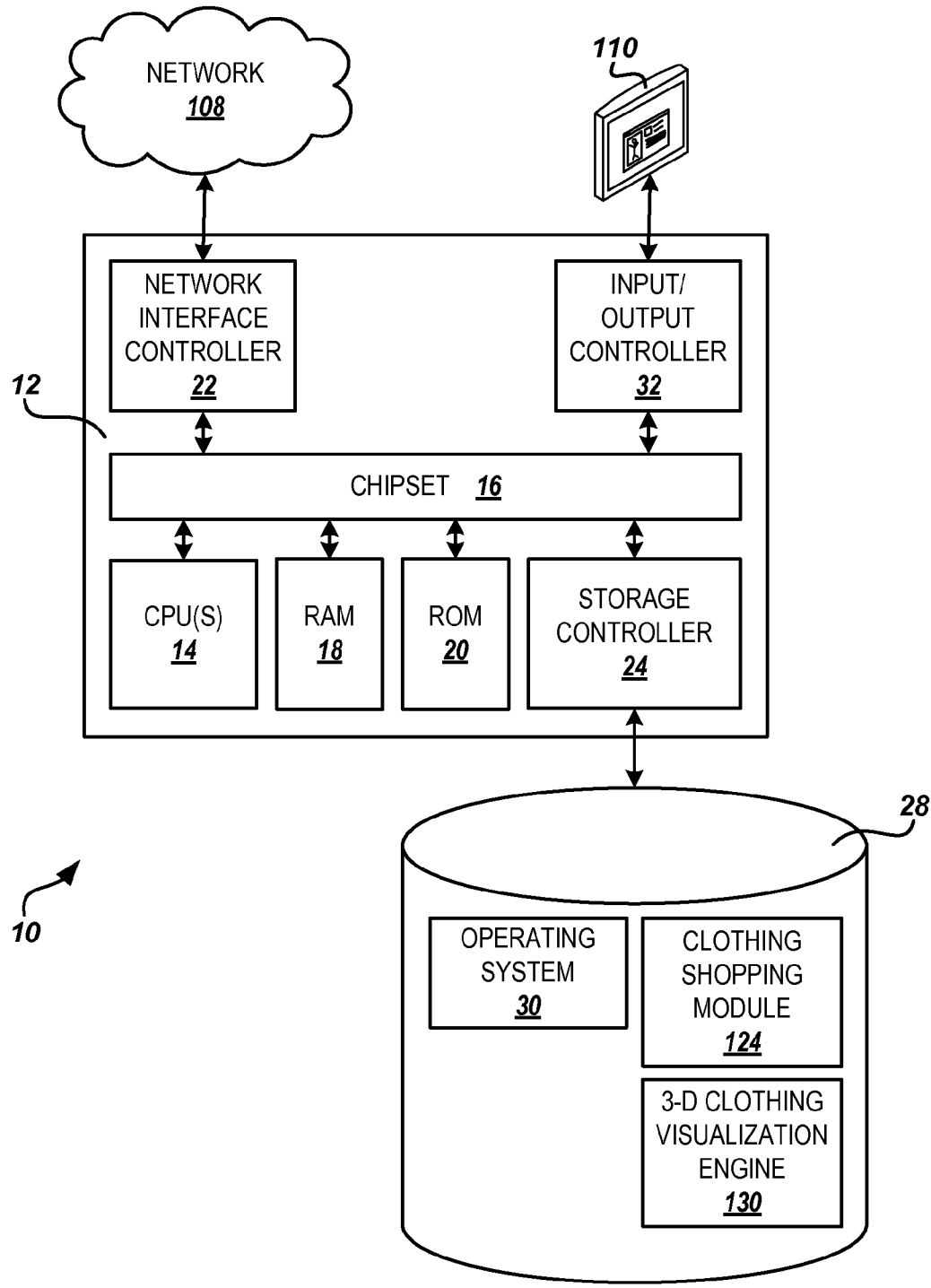
FIG. 9 is a computer architecture diagram showing an illustrative computer hardware architecture for computing devices described in embodiments presented herein.

FIG. 9 shows an example computer architecture 10 for a computer 12 capable of executing the software components described herein for providing visualization of fit, flow, and texture of clothing to an online consumer, in the manner presented above. The computer architecture 10 shown in FIG. 9 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the server computer 122, the consumer computing device 102, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

The chipset 16 further includes functionality for providing network connectivity through a network interface controller ("NIC") 22, such as a gigabit Ethernet adapter. The NIC 22 is capable of connecting the computer 12 to other computing devices over the network 108, such as other server computers 122, the consumer computing device 102, a data storage system 128 in the merchant system 120, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage media to store and retrieve information, such as program modules, data structures, or other data. It should be appreciated by those skilled in the art that computer-readable storage media can be any available, non-transitory media that may be accessed by the computer 12. Computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other non-transitory medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the clothing shopping module 124 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 800 for generating a 3-D visualization of the fit, flow, and texture of a selected clothing item, as described above in regard to FIG. 8.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device 110, such as a computer monitor, a flat-panel display, a digital projector, a printer, a plotter, or other type of output device. It will be appreciated that the computer 12 may not include all of the components shown in FIG. 9, may include other components that are not explicitly shown in FIG. 9, or may utilize an architecture completely different than that shown in FIG. 9.

Based on the foregoing, it should be appreciated that technologies for providing visualization of fit, flow, and texture of clothing to an online consumer are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a visualization of fit, flow, and texture of a clothing item to an online consumer, the method comprising executing instructions in a computer system to perform the operations of:

storing at a computer a plurality of three-dimensional models of the clothing item created by placing a representative size of the clothing item on a plurality of mannequins having distinct body shapes and scanning the plurality of mannequins wearing the clothing item with a three-dimensional scanner, wherein the three-dimensional scanner captures the fit, flow, and texture of the clothing item as worn by the mannequin, and wherein body dimensions of each of the plurality of mannequins are known;

receiving data regarding a body shape and body dimensions of the consumer, wherein the data regarding the body shape and body dimensions of the consumer comprises data describing a three-dimensional avatar representing the consumer;

selecting a three-dimensional model of the clothing item from the plurality of three-dimensional models of the clothing item based upon the body shape of the consumer;

scaling the selected three-dimensional model of the clothing item based on a comparison between each of the body dimensions of the mannequin and a corresponding body dimension of the consumer; and combining the scaled three-dimensional model of the clothing item with the three-dimensional avatar to produce a three-dimensional visualization of the consumer wearing the clothing item.

2. The computer-implemented method of claim 1, wherein detailed measurements describing each available size of the clothing item are maintained, and wherein scaling the selected three-dimensional model of the clothing item further comprises scaling the three-dimensional model of the clothing item based on the detailed measurements regarding the representative size of the clothing item and the detailed measurements regarding a selected size of the clothing item for the consumer.

3. The computer-implemented method of claim 1, wherein the three-dimensional visualization of the consumer wearing the clothing item is presented to the consumer on a display attached to a consumer computing device, and wherein the consumer may manipulate the three-dimensional visualization in order to see the fit, flow, and texture of the clothing item as worn by the consumer.

4. A non-transitory computer-readable storage medium having computer-executable instructions stored thereon that, when executed by a computer, cause the computer to:

maintain data describing three-dimensional models of each of a plurality of clothing items as worn by a body model and body dimensional data regarding the body model;

receive body dimensional data regarding a consumer and data describing a three-dimensional avatar representing the consumer;

receive a selection of one or more of the plurality of clothing items;

scale the three-dimensional models of each of the one or more selected clothing items based on a comparison of the body dimensional data regarding the body model and the body dimensional data representing the consumer; and combine the scaled three-dimensional models with the three-dimensional avatar to produce a three-dimensional visualization of the consumer wearing the one or more selected clothing items.

5. The computer-readable storage medium of claim 4, wherein detailed measurements describing each available size of the plurality of clothing items are maintained, and wherein scaling the three-dimensional models of the one or more selected clothing items further comprises scaling the three-dimensional models of the one or more selected clothing items based on the detailed measurements regarding a size of each clothing item on the body model and the detailed measurements regarding a selected size for the consumer of each of the one or more selected clothing items.

6. The computer-readable storage medium of claim 4, having further computer-executable instructions stored thereupon which, when executed by the computer, cause the computer to:

obtain the data describing the three-dimensional models of each of the plurality of clothing items by placing a representative size of each of the plurality of clothing items on an appropriately sized mannequin and scanning the mannequin wearing the clothing item with a three-dimensional photographic scanner.

7. The computer-readable storage medium of claim 6, wherein a plurality of three-dimensional models are obtained for each of the plurality of clothing items by placing the representative size of each of the plurality of clothing items on a plurality of mannequins, each of the plurality of mannequins having a distinct body shape, and scanning each of the plurality of mannequins wearing the clothing item with a three-dimensional photographic scanner.

8. The computer-readable storage medium of claim 4, wherein each of the three-dimensional models of each of the plurality of clothing items captures a fit, flow, and texture of the clothing item as worn by the body model.

9. The computer-readable storage medium of claim 8, wherein the three-dimensional visualization of the consumer wearing the one or more selected clothing items is presented to the consumer on a display attached to a consumer computing device, and wherein the consumer may manipulate the three-dimensional visualization in order to see the fit, flow, and texture of the clothing item as worn by the consumer.

10. The computer-readable storage medium of claim 9, wherein the consumer computing device comprises a gaming console having a motion-capture camera input device, and wherein the consumer manipulates the three-dimensional visualization through motion detected by the motion-capture camera input device.

11. The computer-readable storage medium of claim 4, wherein one or more of the selected clothing items correspond to three-dimensional models generated from data supplied by the consumer.

12. A computer-implemented method for providing a visualization of fit, flow, and texture of a clothing item to an online consumer, the method comprising executing instructions in a computer system to perform the operations of:

maintaining data at the computer system describing a plurality of three-dimensional models of a clothing item, wherein each of the plurality of three-dimensional models represents the clothing item as worn by a specifically shaped body model;

receiving data regarding a body shape and body dimensions of the consumer, wherein the data regarding the body shape and body dimensions of the consumer comprises data describing a three-dimensional avatar representing the consumer;

selecting a three-dimensional model from the plurality three-dimensional models of the clothing item based upon the body shape of the consumer;

scaling the selected three-dimensional model of the clothing item according to the data regarding the body dimensions of the consumer; and combining the scaled three-dimensional model of the clothing item with the three-dimensional avatar to produce a three-dimensional visualization of the consumer wearing the clothing item.

13. The computer-implemented method of claim 12, wherein the data describing the plurality of three-dimensional models of the clothing item further comprises dimensions regarding the body model represented in each of the plurality of three-dimensional models, and wherein scaling the selected three-dimensional model of the clothing item comprises scaling the three-dimensional model of the clothing item based on a comparison between each dimension regarding the body model and a corresponding body dimension of the consumer.

14. The computer-implemented method of claim 13, wherein detailed measurements describing each available size of the clothing item are maintained, and wherein scaling the selected three-dimensional model of the clothing item further comprises scaling the three-dimensional model of the clothing item based on the detailed measurements regarding a size of the clothing item on the body model and the detailed measurements regarding a selected size of the clothing item for the consumer.

15. The computer-implemented method of claim 12, further comprising:
    obtaining the data describing each of the plurality of three-dimensional models of the clothing item as worn by the specifically shaped body model by placing a representative size of the clothing item on an appropriately sized mannequin having the specific body shape, and scanning the mannequin wearing the clothing item with a three-dimensional photographic scanner.

16. The computer-implemented method of claim 12, wherein each of the plurality of three-dimensional models of the clothing item represents a fit, flow, and texture of the clothing item as worn by the specifically shaped body model.

17. The computer-implemented method of claim 16, wherein the three-dimensional visualization of the consumer wearing the clothing item is presented to the consumer on a display attached to a consumer computing device, and wherein the consumer may manipulate the three-dimensional visualization in order to see the fit, flow, and texture of the clothing item as worn by the consumer.

18. A system for providing a visualization of fit, flow, and texture of a clothing item to an online consumer, the system comprising:
    a merchant system comprising one or more server computers; and
    a 3-D clothing visualization engine executing on the one or more server computers and configured to perform the operations of:
        receive a plurality of three-dimensional models of a clothing item, wherein each of the plurality of three-dimensional models represents a representative size of the clothing item worn by a specifically shaped body model,
        receive data regarding a body shape and dimensions of the consumer, wherein the data regarding the body shape and dimensions of the consumer comprises data describing a three-dimensional avatar representing the consumer,
        select a three-dimensional model of the clothing item from the plurality of three-dimensional models of the clothing item based upon the body shape of the consumer, and
        combine the selected three-dimensional model of the clothing item with the three-dimensional avatar to produce a three-dimensional visualization of the consumer wearing the clothing item.

19. The system of claim 18, wherein the data describing the plurality of three-dimensional models of the clothing item further comprises dimensions regarding the body model represented in each of the plurality of three-dimensional models, and combining the selected three-dimensional model of the clothing item with the three-dimensional avatar comprises scaling the selected three-dimensional model of the clothing item based on a comparison between each dimension regarding the body model and a corresponding dimension of the consumer.

20. The system of claim 18, wherein detailed measurements describing each available size of the clothing item are maintained, and wherein combining the selected three-dimensional model of the clothing item with the three-dimensional avatar comprises scaling the three-dimensional model of the clothing item based on the detailed measurements regarding a size of the clothing item on the body model and the detailed measurements regarding a selected size of the clothing item for the consumer.

21. The system of claim 18, wherein each of the plurality of three-dimensional models captures a fit, flow, and texture of the clothing item as worn by the specifically shaped body model.

22. The system of claim 21, wherein the three-dimensional visualization of the consumer wearing the clothing item is presented to the consumer on a display attached to a consumer computing device, and wherein the consumer may manipulate the three-dimensional visualization in order to see the fit, flow, and texture of the clothing item as worn by the consumer.

* * * * *